(12) United States Patent
Dudeck et al.

(10) Patent No.: US 6,926,374 B2
(45) Date of Patent: Aug. 9, 2005

(54) AUTOMATIC BRAKE AND STEERING SYSTEM AND METHOD FOR A VEHICLE

(75) Inventors: Ingo Dudeck, Weinstadt (DE); Rainer Freitag, Owen (DE); Gerhard Kurz, Wendlingen (DE); Wofgang Lauer, Heilbronn (DE); Thomas Roehrig-Gericke, Weil im Schoenbuch (DE); Reinhold Schoeb, Gaeufelden (DE); Harry Troester, Tamm (DE); Andy Yap, Boeblingen (DE); Richard Zimmer, Fellbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/333,594

(22) PCT Filed: Jul. 12, 2001

(86) PCT No.: PCT/EP01/08060

§ 371 (c)(1),
(2), (4) Date: Jun. 19, 2003

(87) PCT Pub. No.: WO02/08010

PCT Pub. Date: Jan. 31, 2002

(65) Prior Publication Data

US 2004/0090117 A1 May 13, 2004

(30) Foreign Application Priority Data

Jul. 26, 2000 (DE) .......................... 100 36 276

(51) Int. Cl.⁷ .............................................. B60Q 1/22
(52) U.S. Cl. ..................................... 303/191; 701/301
(58) Field of Search ................................. 303/190, 191; 701/300, 301; 340/435, 436

(56) References Cited

U.S. PATENT DOCUMENTS

| | | | | |
|---|---|---|---|---|
| 5,332,057 A | * | 7/1994 | Butsuen et al. ............. | 180/169 |
| 5,541,590 A | * | 7/1996 | Nishio ......................... | 340/903 |
| 6,026,347 A | | 2/2000 | Schuster | |
| 6,037,860 A | * | 3/2000 | Zander et al. ............... | 340/436 |
| 6,084,508 A | * | 7/2000 | Mai et al. .................... | 340/463 |
| 6,269,307 B1 | * | 7/2001 | Shinmura et al. ........... | 701/301 |
| 6,405,132 B1 | * | 6/2002 | Breed et al. ................. | 701/301 |
| 6,553,130 B1 | * | 4/2003 | Lemelson et al. .......... | 382/104 |
| 6,571,176 B1 | * | 5/2003 | Shinmura et al. ........... | 701/301 |

FOREIGN PATENT DOCUMENTS

| | | |
|---|---|---|
| DE | 40 39 005 A1 | 6/1991 |
| EP | 0 582 236 A1 | 2/1994 |
| EP | 0 891 903 A2 | 1/1999 |
| EP | 0 967 121 A2 | 12/1999 |
| EP | 0 991 045 A2 | 4/2000 |
| WO | WO 90/02985 | 3/1990 |

* cited by examiner

Primary Examiner—Chris Schwartz
(74) Attorney, Agent, or Firm—Crowell & Moring LLP

(57) ABSTRACT

An automatic brake and steering system and method for a vehicle contains a sensor unit for sensing vehicle state and characteristic variables, and ambient conditions. Furthermore, a control unit and actuator devices are provided for setting the vehicle brake system and/or the vehicle steering system. In order to be able to carry out automatic avoidance maneuvers with maximum safety, an avoidance route is determined if there is an obstacle in the path of the vehicle. Thereby, if there is a further obstacle on the avoidance route, the strategy for determining the avoidance route is applied once more. If it is not possible to find a collision-free avoidance route, that route on which the difference between the remaining braking distance and the remaining distance from the obstacle is smallest is selected.

43 Claims, 2 Drawing Sheets

AUTOMATIC BRAKE AND STEERING SYSTEM AND METHOD FOR A VEHICLE

BACKGROUND OF THE INVENTION

The present invention relates to an automatic brake and steering system for a vehicle. More particularly, the present invention relates to such a system having a sensor unit for sensing vehicle state variables and vehicle characteristic variables as well as for sensing ambient conditions, having a control unit in which actuation signals can be generated as a function of the vehicle state variables and the ambient conditions, it being possible to feed actuation signals to actuation devices in the vehicle in order to set the vehicle brake and the vehicle steering system, the distance between the current position of the vehicle and the obstacle as well as the expected braking distance in order to stop the vehicle being determined when there is an obstacle in the path of the vehicle, and an avoidance path for driving around the obstacle being automatically driven along in accordance with a stored avoidance strategy.

DE 40 39 005 A1 discloses a control system for a vehicle which comprises a sensor arrangement, a central control unit and a multiplicity of actuator devices for various assemblies of a vehicle which influence the state of the vehicle. The sensor arrangement registers activities carried out by the driver, in particular a braking and a steering activity of the driver, and vehicle state variables, for example the speed of the vehicle and the wheel speeds are determined. The determined signals are processed, in accordance with a stored calculation rule, in the control unit in which actuation signals are generated which are fed to the actuator devices of the vehicle assemblies in order to manipulate the state of the vehicle. The assemblies to be influenced comprise, inter alia, the vehicle gearbox, a steering control device and a brake device.

This known control system has the disadvantage that only activities of the driver and the vehicle state can be sensed but not processes and states which take place or exist outside the vehicle. It is therefore not possible to sense possible obstacles on the carriageway and to take measures to avoid collisions. The control system described in DE 40 39 005 A1 cannot be used to implement automatic, autonomous driving.

WO 90/02985 A1 discloses a method and a device for automatically avoiding collisions for vehicles. The device and method include predictive sensing of an obstacle, the collision-avoiding avoidance maneuver being carried out when an obstacle is detected. When there is an object, an avoidance path is calculated in accordance with an avoidance strategy stored in the control unit. The actuator device for the steering is acted on in such a way that the vehicle follows the avoidance path and drives around the obstacle.

Although the brake and steering system described in WO 90/02985 A1 enables collisions with obstacles to be avoided in a predictive way by carrying out braking maneuvers and avoidance maneuvers, it is disadvantageous that the avoidance strategy does not contain any alternatives if further unexpected obstacles arise during the avoidance maneuver.

SUMMARY OF THE INVENTION

The present invention is based on an object of providing a vehicle system with which automatic avoidance maneuvers can be carried out with the highest possible degree of safety.

This problem has been solved according to the present invention by providing that, in the event of a further obstacle lying in the avoidance path, the avoidance strategy is applied once more in order to calculate an alternative avoidance path such that, in the event of it being impossible to find a collision-free avoidance path, that avoidance path on which the difference between the remaining braking distance and the remaining distance from the obstacle on the respective avoidance path is the shortest is selected form a plurality of alternatives.

In the novel automatic brake and steering system according to the present invention, at least in the event of a further obstacle being discovered in the avoidance path, an alternative avoidance path is calculated once more in order to obtain an alternative route for driving around the further obstacle. If the alternative route makes it possible to drive around the obstacle without danger, the assemblies of the vehicle have corresponding actuation signals applied to them in order to follow the alternative route. However, if the alternative route does not permit hazard-free avoidance, according to a stored optimization strategy, that avoidance route on which the expected damage is smallest is advantageously selected. Expediently, the difference between the remaining braking distance and the remaining distance from the obstacle is determined—starting from the current position of the vehicle—for each determined avoidance route, and that avoidance route on which the difference between the braking distance and the distance is smallest is adopted.

As an alternative to the optimization strategy of the minimum distance between the remaining braking distance and the remaining distance from the obstacle, it is, however, also contemplated to apply other optimization criteria. It may, in particular, be expedient for peripheral conditions which result from the topology of the surrounding area to be taken into account in the determination of the avoidance route. Such peripheral conditions may be defined, for example, by determining the absolute position of the vehicle by a position-determining system while taking into account the topology known from an electronic road map.

On the basis of the avoidance strategy of the present invention, it is ensured that, if a collision cannot be avoided, that route on which the vehicle has the smallest remaining braking distance on reaching the obstacle is selected so that the speed of the vehicle is also minimized at the time of the impact and the damage is also correspondingly kept as small as possible.

In one expedient embodiment, additional peripheral conditions in the surroundings, which conditions can be sensed by the sensor unit of the brake and steering system, are taken into account. These additional peripheral conditions which describe, in particular, characteristic features of the surroundings are included in the avoidance strategy in order to ensure that the avoidance route of the vehicle does not lead to greater damage than if the vehicle remained on the previous route. By virtue of the formulation of the peripheral conditions, it is possible to take into account additional safety-related aspects in the selection of the route. For example, it is thus contemplated for the obstacles which can be sensed by the sensor unit to be divided into different categories, it being also possible to define categories of obstacles with which a collision can be avoided unconditionally. This relates in particular to persons on the carriageway and/or on the avoidance route.

It is also contemplated to take into account as a peripheral condition the fact that the avoidance route must not lead onto the oncoming carriageway. This applies in particular to the case in which, when performing an avoidance maneuver onto the oncoming carriageway, there is the risk of the driver's own vehicle or of another vehicle being put in danger, for example if there is oncoming traffic on the oncoming carriageway during the avoidance maneuver, which can be sensed in particular by the sensor unit.

In order to be able to drive around an obstacle by way of the avoidance route, the steering system of the vehicle must be manipulated. However, in the event of the steering actuator device failing, an equivalent strategy which uses the remaining, still intact vehicle assemblies to minimize damage is expediently followed. To do this, in particular, the assemblies of the vehicle which influence the longitudinal dynamics of the vehicle are manipulated, expediently in order to achieve optimum deceleration with a minimum braking distance.

According to a further preferred embodiment, a communication system, in particular a graphic display, on which the actual position of the vehicle and the setpoint position which has been determined in accordance with the avoidance strategy are represented, is provided in the vehicle. In this way, the driver is informed whether the vehicle is actually on the optimum route—the avoidance path—in the case of a hazard. This provides advantages in particular for a situation in which the automatic guidance of the vehicle over the avoidance path does not function or does not function completely or else in which such automatic control has not yet been implemented, or not yet implemented completely. In this case, the driver can use the information relating to the actual and setpoint positions for the vehicle which has been communicated to him, in particular by way of the graphic display, to initiate and carry out steering and braking maneuvers automatically in order to be able to reach, and/or comply with, the displayed setpoint position of the vehicle.

BRIEF DESCRIPTION OF THE DRAWINGS

These and other objects, features and advantages of the present invention will become more readily apparent from the following detailed description of currently preferred configurations thereof when taken in conjunction with the accompanying drawings wherein.

DETAILED DESCRIPTION OF THE DRAWINGS

Figure 1:
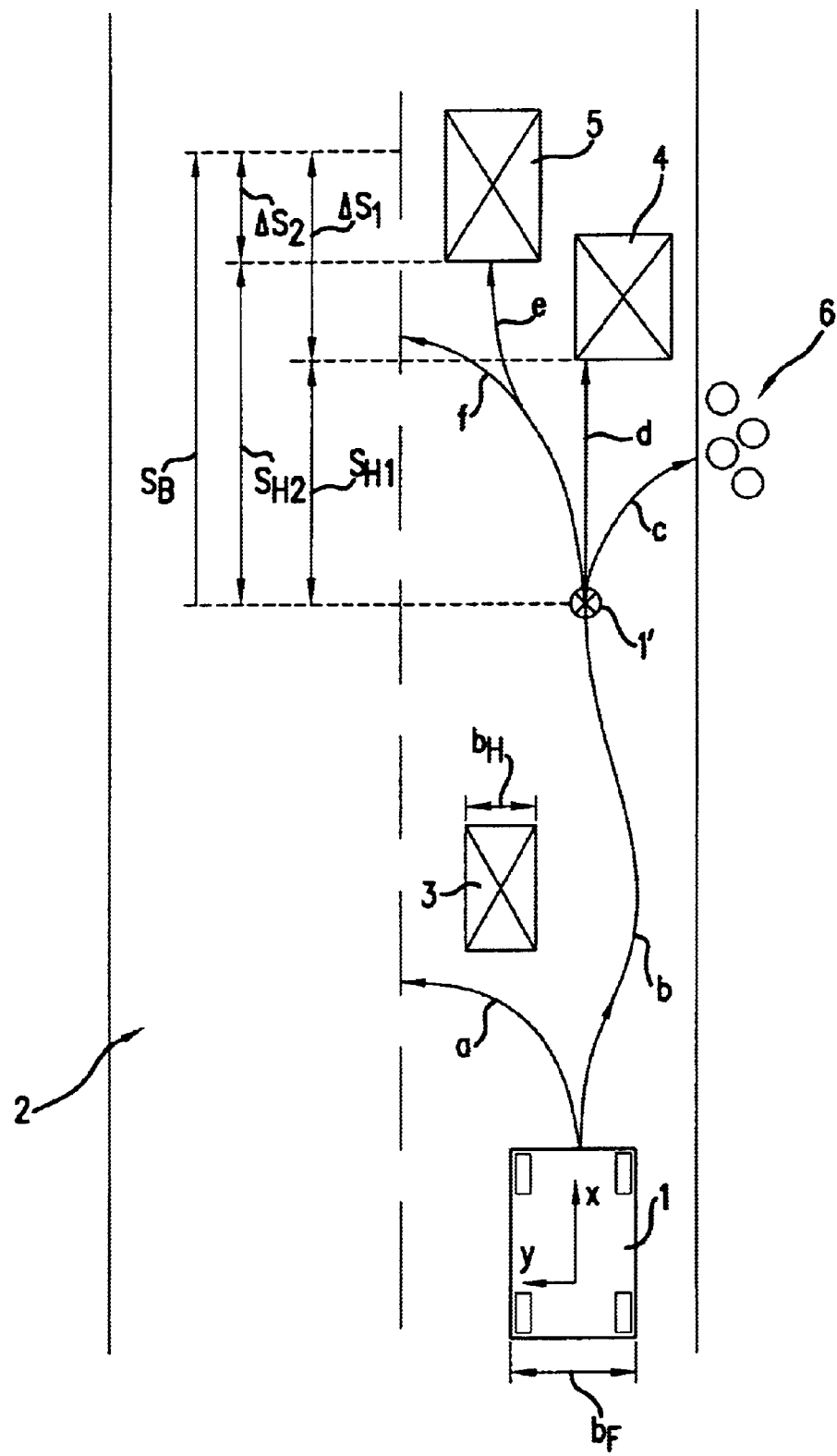
FIG. 1 is a schematic diagram which shows various avoidance routes of a vehicle on a road in order to drive around a plurality of obstacles.

FIG. 1 illustrates a vehicle 1 on the right-hand half of the carriageway of a road 2. The vehicle 1 will be assumed to be equipped with an automatic brake and steering system which permits the vehicle to be automatically braked and steered as a function of processes, states, events and activities, both outside and inside the vehicle. The variables which influence the brake and steering system comprise, in particular, vehicle state variables (e.g., speed of the vehicle and the steering speed), vehicle operating variables or vehicle characteristic variables (e.g., the wheel base), and also signals which originate from a sensor unit and by way of which the ambient conditions can be detected (e.g., obstacles on the carriageway or at the edge of the carriageway or weather-related influences). The sensor unit forms a component of the brake and steering system which is also assigned a control unit in which actuation signals can be generated as a function of the vehicle state variables and the ambient conditions. By way of signal transmission devices, these actuation signals are fed to various actuator devices for setting the vehicle brake and/or the vehicle steering system, if appropriate also to further assemblies which influence the state of the vehicle, in particular the ignition and injection of the internal combustion engine of the vehicle.

In the case of an obstacle which blocks the path of the vehicle or at least lies with an inadequate safety distance in the path of the vehicle and which can be detected by the sensor unit, according to stored calculation rules avoidance maneuvers, for avoiding collision with the obstacle or avoiding putting the vehicle at risk are determined in the control unit as a function of the vehicle state variables and the ambient conditions.

In the herein-described and illustrated embodiment, there is an obstacle 3 lying in the path of the vehicle 1 on the carriageway so that the vehicle 1 has to carry out an avoidance maneuver in order to avoid a collision with the obstacle 3, or to prevent the obstacle 3 from constituting a hazard. The obstacle 3, which can be detected by the sensor unit of the brake and steering system of the vehicle 1, for example by a radar system which is carried along in the vehicle 1, forces the vehicle onto avoidance routes which are to be selected in compliance with additional peripheral conditions, in particular in compliance with safety-related criteria.

In the case of the obstacle 3 located in front of the vehicle 1 in the direction of travel, two avoidance routes a and b, which lead past the obstacle 3 on the left, and respectively on the right, are considered. In order to avoid an avoidance route which is to be adopted constituting a further hazard for the vehicle 1, peripheral conditions are predefined which are to be complied with in the selection of the avoidance route. One peripheral condition which is taken into account is in particular the fact that the avoidance route must not lead onto the oncoming carriageway, so as to avoid a collision with oncoming traffic. However, this peripheral condition can, if appropriate, be restricted to the fact that an avoidance maneuver onto the oncoming carriageway is prohibited only if there is actually oncoming traffic; however, this requires powerful sensor devices in the vehicle 1 which can look far ahead, and moreover, further favorable ambient conditions, in particular requires a clear view of the course of the route.

An additional criterion to be taken into account in determining the avoidance route is the curvature of the avoidance route which has to be selected, in particular as a function of the longitudinal speed of the vehicle, in such a way that no unacceptably high lateral accelerations occur at the vehicle.

As soon as it is detected in the brake and steering system that there is an obstacle in the current path of the vehicle, avoidance routes are determined in accordance with the stored avoidance strategy. The theoretically possible avoidance routes lead to the left and right of the obstacle, and in the exemplary embodiment two avoidance routes a and b on which the vehicle 1 can theoretically drive around the obstacle 3 are shown leading past the obstacle 3 on the left and right. However, the avoidance route a cannot be implemented in the exemplary embodiment owing to a restricting peripheral condition, as this route a leads onto the oncoming carriageway, which is generally not permitted. The only path which avoids the obstacle 3 is the avoidance route b which leads past the obstacle 3 on the right.

In the brake and steering system, the vehicle 1 will advantageously continuously sense the surroundings, in particular at short cyclical intervals, and this ambient data recorded by the sensor unit is used to determine further driving strategies continuously or cyclically, and if appropriate also carry them out. If no further obstacles or disruption occur, the avoidance route is expediently selected in such a way that the original lateral position of the vehicle 1 with respect to the edge of the carriageway is reached again in the lateral direction after the termination of the avoidance maneuver.

If an avoidance maneuver has to be carried out, the lateral component y of the avoidance path is advantageously calculated—measured from the start of the avoidance maneuver, as a clothoid in accordance with the function $$y = \int (v^2(t)\dot{\Theta}(t)t^2)/L \, dt$$

as a function of the vehicle longitudinal speed v, the longitudinal speed $\dot{\Theta}$, the wheel base L and the time t. It is to be noted that, in order to drive around the obstacle reliably, the minimum lateral component $y_{min}$ of the avoidance path is expediently determined by adding half the obstacle width $b_H$ and half the vehicle width $b_F$ in accordance with the relationship $$y_{min} = \frac{1}{2}(b_H + b_F),$$

in which, if appropriate, an additional lateral safety distance is to be taken into account.

The longitudinal component x of the avoidance path is determined according to the relationship $$x = \int v(t) \, dt$$

as a function of the vehicle speed v.

As an alternative to the clothoid, the cubic parabola can also be selected as an avoidance function.

In FIG. 1, a further case with a multiplicity of obstacles is illustrated in the path d of the vehicle, starting from a vehicle position 1' of the vehicle. In the straight-ahead direction there is an obstacle 4 in the path of the vehicle. A further obstacle 5 lies offset to the side and at a relatively large distance from the vehicle in the longitudinal direction, and additional individual obstacles 6 are located outside the road 2 at the edge of the path. After the obstacle 4 which lies directly on the lane d, the vehicle will determine avoidance maneuvers or avoidance routes c and e, passing the obstacle 4 on the right and left, respectively, starting from the indicated position 1'.

During the determination of the avoidance route which is to be carried out last, firstly those alternatives which are incompatible with peripheral conditions which are to be additionally borne in mind are eliminated. The obstacles can be divided, as such peripheral conditions, into hierarchical categories which are evaluated with degrees of risk of different levels for the driver's own vehicle or else for external persons or objects. In this way it is possible for persons who are located outside the vehicle in question, for example standing at the edge of the path and are identified by the sensor unit as persons, to be placed in a category of obstacles with which a collision must be avoided under all circumstances. By the division and classification into various categories, it is possible to perform presorting among a plurality of avoidance routes which are determined.

In the embodiment described herein, the obstacle 6 can be concerned with individual persons so that it is not possible to perform an avoidance maneuver via the route c.

Further remaining alternatives are—starting from the vehicle position 1'—the route d which corresponds to the normal path and leads to a collision with the obstacle 4, as well as the avoidance route e, which however, in due course, would also lead to a collision with the obstacle 5 which is further away. As the avoidance route c has definitely been eliminated, it is necessary to make a selection among the remaining routes d and e. As a selection criterion, firstly the distance between the current vehicle position 1' and the obstacles 4 and 5 are determined in the longitudinal direction x. The distance between the vehicle position 1' and the obstacle 4 which is closer is $s_{H1}$, the distance from the obstacle 5 which is further away is $s_{H2}$. At the same time, the remaining minimum braking distance $s_B$, which is expected to be necessary starting from the current vehicle position 1' up to a complete standstill of the vehicle in the longitudinal direction x is determined at the same time in the control unit of the brake and steering system. If the remaining braking distance $s_B$ exceeds the distance $s_{H1}$ and $s_{H2}$ which is available for obstacle-free journey as far as the obstacles, and consequently a collision-free avoidance path starting from the vehicle position 1' cannot be found, that avoidance path in which the difference between the braking distance $s_B$ and the distance $s_{H1}$ or $s_{H2}$ from the respective obstacle 4 or 5 is smallest is then selected as a criterion for the selection among the remaining routes d and e. Owing to the larger longitudinal distance between the obstacle 5 and the current vehicle position 1', this difference which is referred to by $\Delta s_1$ and $\Delta s_2$ is smallest for the obstacle 5, and accordingly the avoidance route e is selected. Owing to the larger distance from the obstacle 5, the vehicle will be decelerated to a lower speed than when approaching the obstacle 4 on the route d, and the damage in the event of an impact against the obstacle 5 will be less than the damage in the event of an impact against the closer obstacle 4.

After the vehicle has adopted the avoidance route e starting from the position 1', further avoidance routes are investigated continuously in cyclical intervals. In the process, further alternatives may be found, for example an avoidance route f, which can however only be carried out if no additional peripheral conditions are infringed or if the route f is placed in a classification category which is the same, or preferably more favorable, in terms of safety aspects than the route e which has been adopted at the particular time. However, in the exemplary embodiment, the route f is not a feasible alternative to the route e as the route f leads onto the oncoming carriageway.

In the event of a failure of the steering actuation device which brings about automatic steering, it is not possible to perform an automatic lateral avoidance maneuver and drive around an obstacle. In this case, the vehicle longitudinal dynamics are expediently influenced in accordance with a stored equivalent strategy, in particular maximum deceleration is generated by acting on the vehicle brake and/or the engine in order to brake the vehicle as quickly as possible to a standstill after the detection of the failure of the steering actuation device and after an obstacle has been detected. This strategy can also be applied generally if a steering actuation device is not present in the vehicle.

In a further currently preferred embodiment, a communication system, in particular a graphic communication system for representing the actual vehicle position and setpoint position which is to be adopted in accordance with the avoidance route is provided in the vehicle. In particular, if the automatic adoption of an avoidance route is not possible, or not entirely possible, as a result of an impaired function of the brake and steering system, the driver is provided, by way of the communication system, with sufficient information on the optimum driving route which can be correspondingly adopted manually by the driver.

In a further embodiment, a memory unit in which data of the brake and steering system can be stored permanently or temporarily is assigned to the brake and steering system. Both the data used as the basis for triggering the automatic brake and/or steering system and the data generated by the brake and steering system is expediently stored in order, subsequently, to be able to determine and assess both the database which the brake and steering system uses as a basis for generating actuation signals, and the generated actuation signals themselves and/or their effect. In particular, both setpoint variables and actual variables can be stored in the memory unit. The behavior of the brake system and the occurrence of a fault in the brake and steering system can be reconstructed on the basis of the stored data. In addition, decisions of the driver which run counter to decisions or proposals of the brake and steering system can subsequently be checked for correctness. The data can be stored in the memory unit for a limited time or for an unlimited time. In the case of a chronological limitation which is predefined to a specific storage interval, after the first pass of the storage interval, data from the elapsed storage interval is advantageously continuously overwritten with subsequent data.

It may also be advantageous to provide, in the vehicle, a position-determining system for determining the instantaneous absolute position, for example a satellite-supported position-determining system GPS. In conjunction with an electronic road map which is to be carried along in the vehicle and which contains information in digitized form relating to the topography of the road which is currently being driven on and the surroundings, a navigation system with which additional criteria can be taken into account in the selection of the avoidance route is obtained in that topographical or topological conditions which result from the electronic map are taken into account by the sensor unit carried along in the vehicle, independently of the detection of obstacles. In this way, the absolute vehicle position is expediently determined using the position-determining system and transmitted into the electronic road map from which the profile of the road and in particular the lateral boundaries of the road as well as fixed obstacles are known, which is to be taken into account as a peripheral condition, in the sense of a region which is not to be driven through or only to be driven through under special circumstances, in the determination of the avoidance route. The road profile can, if appropriate, also be stored in a three-dimensional form and taken into account in the selection of the suitable route as a spatial curve.

Figure 2:
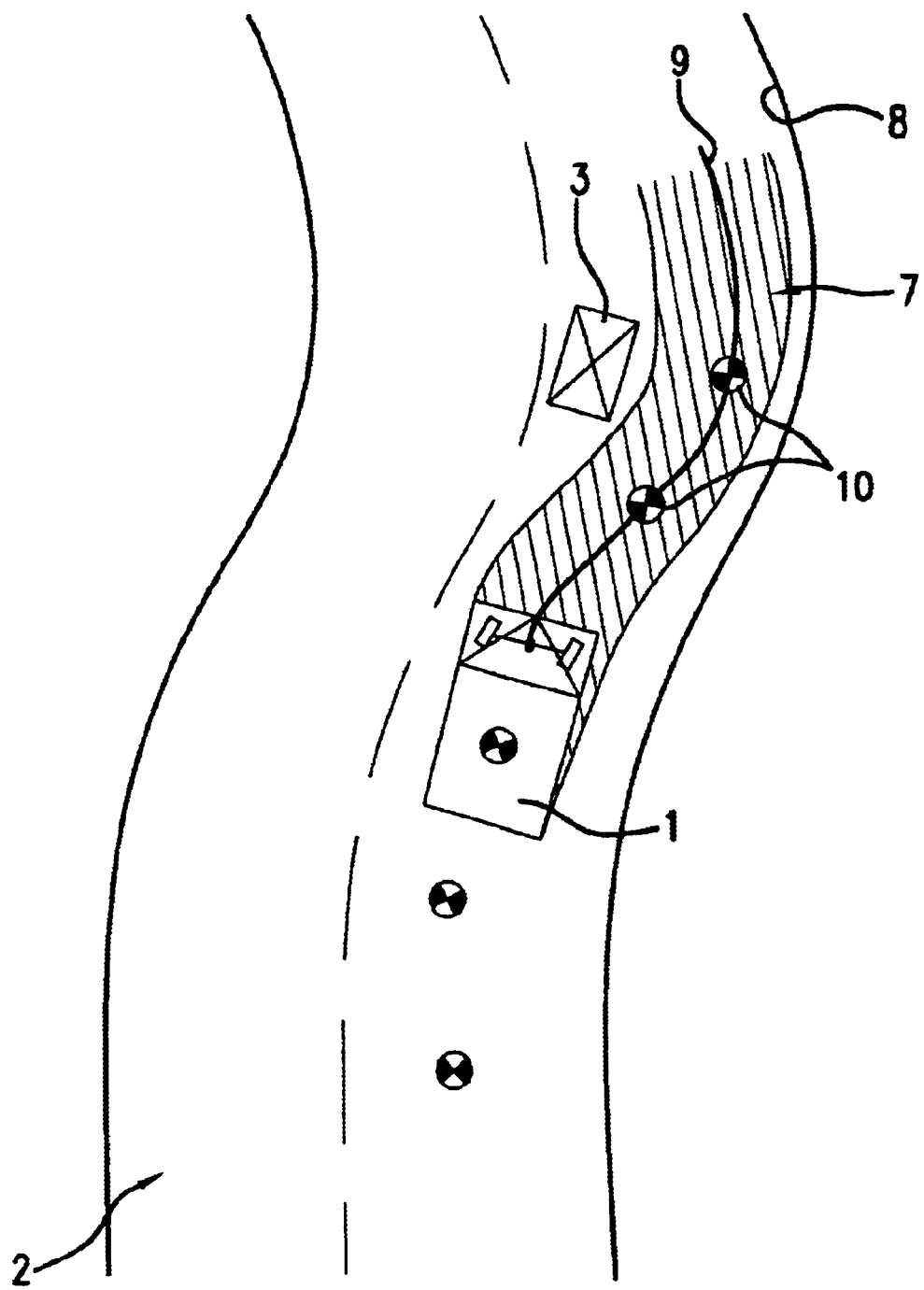
FIG. 2 is a schematic diagram which shows a vehicle having a region of possible setpoint trajectories for the continued journey of the vehicle taking into account an obstacle in the path of the vehicle, and the lateral boundaries of the road.

FIG. 2 depicts a vehicle 1 which has an automatic brake and steering system, on a carriageway 2. The vehicle 1 is capable of using its sensor system to detect an obstacle 3 in front of it on the carriageway 2 and of determining an avoidance route which bypasses the obstacle, and of automatically following the selected avoidance route by acting on the steering assemblies and the brake assemblies as well as, if appropriate, also other engine assemblies. The vehicle 1 also has a navigation system which comprises a position-determining system for determining the instantaneous absolute position of the vehicle as discussed above, and an electronic road map in which the topography of the road currently being driven on as well as the surroundings are stored. The position-determining system is expediently a satellite-supported locating system.

By determination of the absolute position of the vehicle 1 and comparison with the electronic road map, it is contemplated to take into account topological conditions and particular features in the current profile of the road and the surroundings as additional peripheral conditions in the determination of the optimum avoidance route. By taking into account the topological route profile as well as the obstacle 3 on the carriageway 2, an area 7 which contains a region which the vehicle 1 is permitted to be in can be determined, with all its possible avoidance routes or trajectories which the vehicle I can theoretically follow in order both to be able to avoid the obstacle 3 and also maintain a sufficient distance from the lateral boundaries 8 of the carriageway or other obstacles which can be obtained from the road map.

From knowledge of the profile of the route which is known from using the navigation system, peripheral conditions can be taken into account in determining and executing the movement of the vehicle both with respect to position and also, if appropriate, with respect to speed and/or acceleration. As a result, a predictive, automatic method of driving is now possible because the two-dimensional, or if appropriate also the three-dimensional profile of the route can be taken into account with respect to positive and negative acceleration forces which act on the vehicle in the longitudinal and lateral directions.

On the area 7 of the permitted vehicle movement, an individual area line or spatial line or trajectory is determined as a setpoint value profile or as a setpoint trajectory for the vehicle. The selection of the setpoint trajectory can in turn be made taking into account optimization criteria or peripheral conditions, and in the simplest approximation that trajectory which lies in the center of the area 7 of the permissible vehicle movement is selected as the setpoint trajectory.

Anchor points 10 which serve as a mathematical location for a dynamic vehicle model which is simulated in the brake and steering system can be set on the setpoint trajectory 9. From this dynamic vehicle model, vehicle variables which reflect the driving behavior of the real vehicle can be determined. If it is decided in the simulation that the vehicle can get into a critical situation when the current state is maintained, interventions can be made steering system in order to avoid such a method situation, for example the vehicle speed can be reduced and/or the setpoint trajectory which yields a more favorable profile, in terms of the hazardous vehicle state, of the accelerations and forces acting on the vehicle, can be redetermined.

What is claimed is:

1. Automatic brake and steering system for a vehicle, comprising a sensor unit configured to sense vehicle state variables, vehicle characteristic variables and ambient conditions, a control unit configured to generate actuation signals as a function of the sensed vehicle state variables and the ambient conditions, actuation signals being feedable to actuation devices in the vehicle to operate the vehicle brake and the vehicle steering system, the system being configured to determine a distance between a current vehicle position and an obstacle, to automatically drive along an avoidance path for driving around the obstacle in accordance with a stored avoidance strategy, to determine obstacle distances between the current vehicle position and each further obstacle when further obstacles are located in front of the vehicle as well as a minimum distance needed to bring the vehicle to a standstill, to determine differences between said minimum distance and said obstacle distances, to select an alternative avoidance path with a smallest difference between said minimum distance and obstacle distances, and to operate the vehicle brake and the vehicle steering system to follow the alternative avoidance path selected.

2. Brake and steering system according to claim 1, wherein the alternative avoidance path selected is that avoidance path which does not lead to an oncoming carriageway.

3. Brake and steering system according to claim 2, wherein the sensor unit is configured to sense peripheral conditions which describe characteristic features of the surroundings, and the system is configured to take the sensed peripheral conditions into account in the avoidance strategy.

4. Brake and steering system according to claim 2, wherein the system divides the further obstacles into categories, with avoidance paths which lead to a collision with a defined category of obstacles being eliminated in the avoidance strategy.

5. Brake and steering system according to claim 1, further comprising a memory unit operatively associated with the brake and steering system, such that at least certain data for the automatic triggering of a brake and/or steering process and/or at least certain data generated by the brake and steering system are storable in the memory unit.

6. Brake and steering system according to claim 5, wherein at least certain data are stored in the memory unit only for a limited, predefined period of time before the vehicle last comes to a standstill.

7. Brake and steering system according to claim 5, wherein certain data are stored in the memory unit without time restriction.

8. Brake and steering system according to claim 7, wherein at least certain data are stored in the memory unit only for a limited, predefined period of time before the vehicle last comes to a standstill.

9. Brake and steering system according to claim 1, wherein an electronic road map is provided and contains digitized data relating to road topography being driven along at a particular time, and road surroundings.

10. Brake and steering system according to claim 9, wherein a position-determining system is provided for determining an instantaneous position of the vehicle.

11. Brake and steering system according to claim 9, wherein the instantaneous vehicle position is enterable into the electronic road map, and peripheral conditions which are to be taken into account in the avoidance strategy are generatable from the position of the vehicle on the road map.

12. Brake and steering system according to claim 1, wherein the system divides the further obstacles into categories, with avoidance paths which lead to a collision with a defined category of obstacles being eliminated in the avoidance strategy.

13. Brake and steering system according to claim 12, wherein the sensor unit is configured to sense peripheral conditions which describe characteristic features of the surroundings, and the system is configured to take the sensed peripheral conditions into account in the avoidance strategy.

14. Brake and steering system according to claim 1, wherein, in case of a failure of a steering actuating device, an assembly which influences vehicle longitudinal dynamics is employed in the system in accordance with a predefined equivalent strategy.

15. Brake and steering system according to claim 14, wherein the system is configured to decelerate the vehicle with maximum deceleration by activating at least one of a vehicle brake and an engine brake.

16. Brake and steering system according to claim 1, wherein a position-determining system is provided for determining an instantaneous position of the vehicle.

17. Brake and steering system according to claim 16, wherein the position-determining system is a satellite-supported system.

18. Brake and steering system according to claim 1, wherein the sensor unit is configured to sense peripheral conditions which describe characteristic features of the surroundings, and the system is configured to take the sensed peripheral conditions into account in the avoidance strategy.

19. Brake and steering system according to claim 1, wherein the vehicle is provided with a graphic display for representing an actual vehicle position and a setpoint position determined in accordance with the avoidance strategy.

20. Automatic brake and steering method for a vehicle, comprising sensing vehicle state variables, vehicle characteristic variables and ambient conditions, generating actuation signals as a function of the sensed vehicle state variables and the ambient conditions, determining a distance between a current vehicle position and an obstacle, feeding the actuation signals to actuation devices in the vehicle to operate the vehicle brake and the vehicle steering system so as to automatically drive along an avoidance path for driving around the obstacle in accordance with a stored avoidance strategy, determining obstacle distances between the current vehicle position and each further obstacle when further obstacles are located in front of the vehicle as well as a minimum distance needed to bring the vehicle to a standstill, determining differences between said minimum distance and said obstacle distances, selecting an alternative avoidance path with a smallest difference between said minimum distance and obstacle distances, and operating the vehicle brake and the vehicle steering system to follow the alternative avoidance path selected.

21. Brake and steering method according to claim 20, further comprising storing at least certain data for at least one of the automatic triggering of a brake, the steering process and brake and steering system generated data.

22. Brake and steering method according to claim 21, wherein certain data are stored in the memory unit without time restriction.

23. Brake and steering method according to claim 22, wherein at least certain data are stored only for a limited, predefined period of time before the vehicle last comes to a standstill.

24. Brake and steering method according to claim 21, wherein at least certain data are stored in the memory unit only for a limited, predefined period of time before the vehicle last comes to a standstill.

25. Brake and steering method according to claim 20, wherein the alternative avoidance path selected is that avoidance path which does not lead to an oncoming carriageway.

26. Brake and steering method according to claim 25, further comprising sensing peripheral conditions which describe characteristic features of the surroundings, and taking into account the sensed peripheral conditions in the avoidance strategy.

27. Brake and steering method according to claim 25, further comprising dividing the further obstacles into categories, with avoidance paths which lead to a collision with a defined category of obstacles being eliminated in the avoidance strategy.

28. Brake and steering method according to claim 20, further comprising dividing the further obstacles into categories, with avoidance paths which lead to a collision with a defined category of obstacles being eliminated in the avoidance strategy.

29. Brake and steering method according to claim 28, further comprising sensing peripheral conditions which describe characteristic features of the surroundings, and taking into account the sensed peripheral conditions in the avoidance strategy.

30. Brake and steering method according to claim 20, further comprising, in case of a failure of a steering actuating device, influencing vehicle longitudinal dynamics in accordance with a predefined equivalent strategy.

31. Brake and steering method according to claim 30, further comprising decelerating the vehicle with maximum deceleration by activating at least one of a vehicle brake and an engine brake.

32. Brake and steering method according to claim 20, further comprising sensing peripheral conditions which describe characteristic features of the surroundings, and taking into account the sensed peripheral conditions in the avoidance strategy.

33. Brake and steering method according to claim 20, further comprising determining an instantaneous position of the vehicle.

34. Brake and steering method according to claim 20, further comprising providing digitized data relating to road topography being driven along at a particular time, and road surroundings.

35. Brake and steering method according to claim 20, further comprising graphically displaying a representation of an actual vehicle position and a setpoint position determined in accordance with the avoidance strategy.

36. Automatic brake and steering system for a vehicle, comprising a sensor unit configured to sense vehicle state variables, vehicle characteristic variables and ambient conditions, a control unit configured to generate actuation signals as a function of the sensed vehicle state variables and the ambient conditions, actuation signals being feedable to actuation devices in the vehicle to operate the vehicle brake and the vehicle steering system, the system being configured to determine a distance between a current vehicle position and an obstacle as well as an expected braking distance in order to stop the vehicle when the obstacle is in the path of the vehicle, and to automatically drive along an avoidance path for driving around the obstacle in accordance with a stored avoidance strategy, and, in the event of a further obstacle lying in the avoidance path, the avoidance strategy is applied again to calculate an alternative avoidance path, such that, in the event of a collision-free avoidance path not being available, the alternative avoidance path is one on which a difference between a minimum distance needed to bring the vehicle to a standstill and a remaining distance from each obstacle on the respective avoidance path is the shortest is selected, wherein a width of the obstacle in a lateral direction of the vehicle is determined, and a minimum lateral component of the avoidance path is determined by adding half of the width of the obstacle determined and half of a vehicle width.

37. Brake and steering system according to claim 36, wherein the sensor unit is configured to sense peripheral conditions which describe characteristic features of the surroundings, and the system is configured to take the sensed peripheral conditions into account in the avoidance strategy.

38. Brake and steering system according to claim 36, wherein the system divides the obstacles into categories, with the avoidance paths which lead to a collision with a defined category of obstacles being eliminated in the avoidance strategy.

39. Automatic brake and steering method for a vehicle, comprising sensing vehicle state variables, vehicle characteristic variables and ambient conditions, generating actuation signals as a function of the sensed vehicle state variables and the ambient conditions, determining a distance between a current vehicle position and an obstacle as well as an expected braking distance in order to stop the vehicle when the obstacle is in the path of the vehicle, feeding the actuation signals to actuation devices in the vehicle to operate the vehicle brake and the vehicle steering system so as to automatically drive along an avoidance path for driving around the obstacle in accordance with a stored avoidance strategy, and, in the event of a further obstacle lying in the avoidance path, the avoidance strategy is applied again to calculate an alternative avoidance path, whereby, in the event of a collision-free avoidance path not being available, the alternative avoidance path is one on which a difference between a minimum distance needed to bring the vehicle to a standstill and a remaining distance from each obstacle on the respective avoidance path is the shortest is selected, determining a width of the obstacle in a lateral direction of the vehicle, and determining a minimum lateral component of the avoidance path by adding half of the width of the obstacle determined and half of a vehicle width.

40. Brake and steering method according to claim 39, further comprising sensing peripheral conditions which describe characteristic features of the surroundings, and taking into account the sensed peripheral conditions in the avoidance strategy.

41. Brake and steering method according to claim 39, further comprising dividing the obstacles into categories, with the avoidance paths which lead to a collision with a defined category of obstacles being eliminated in the avoidance strategy.

42. Automatic brake and steering system for a vehicle, comprising a sensor unit configured to sense vehicle state variables, vehicle characteristic variables and ambient conditions, a control unit configured to generate actuation signals as a function of the sensed vehicle state variables and the ambient conditions, actuation signals being feedable to actuation devices in the vehicle to operate the vehicle brake and the vehicle steering system, the system being configured to determine a distance between a current vehicle position and an obstacle as well as an expected braking distance in order to stop the vehicle when the obstacle is in the path of the vehicle, and to automatically drive along an avoidance path for driving around the obstacle in accordance with a stored avoidance strategy, and, in the event of a further obstacle lying in the avoidance path, the avoidance strategy is applied again to calculate an alternative avoidance path, such that, in the event of a collision-free avoidance path not being available, the alternative avoidance path is one on which a difference between a minimum distance needed to bring the vehicle to a standstill and a remaining distance from each obstacle on the respective avoidance path is the shortest is selected, wherein a lateral component y of the avoidance path is determined as follows:

$$y = \int (v^2(t)\dot{\Theta}(t)t^2)/L \, dt$$

where
v is the vehicle speed,
t is time,
$\dot{\Theta}$ is steering speed, and
L is the wheel base.

43. Automatic brake and steering method for a vehicle, comprising sensing vehicle state variables, vehicle characteristic variables and ambient conditions, generating actuation signals as a function of the sensed vehicle state variables and the ambient conditions, determining a distance between a current vehicle position and an obstacle as well as an expected braking distance in order to stop the vehicle when the obstacle is in the path of the vehicle, feeding the actuation signals to actuation devices in the vehicle to operate the vehicle brake and the vehicle steering system so as to automatically drive along an avoidance path for driving around the obstacle in accordance with a stored avoidance strategy, and, in the event of a further obstacle lying in the avoidance path, the avoidance strategy is applied again to calculate an alternative avoidance path, whereby, in the event of a collision-free avoidance path not being available, the alternative avoidance path is one on which a difference between a minimum distance needed to bring the vehicle to a standstill and a remaining distance from each obstacle on the respective avoidance path is the shortest is selected, where a lateral component y of the avoidance path is determined as follows:

$$y = \int (v^2(t) \dot{\Theta}(t) t^2)/L \, dt$$

where
 v is the vehicle speed,
 t is time,
 $\dot{\Theta}$ is steering speed, and
 L is the wheel base.

* * * * *